(12) United States Patent
Mani

(10) Patent No.: US 11,709,221 B2
(45) Date of Patent: Jul. 25, 2023

(54) NOISE-MITIGATED RADAR SYSTEM

(71) Applicant: TEXAS INSTRUMENTS INCORPORATED, Dallas, TX (US)

(72) Inventor: Anil Varghese Mani, Bengaluru (IN)

(73) Assignee: Texas Instruments Incorporated, Dallas, TX (US)

(*) Notice: Subject to any disclaimer, the term of this patent is extended or adjusted under 35 U.S.C. 154(b) by 197 days.

(21) Appl. No.: 17/013,910

(22) Filed: Sep. 8, 2020

(65) Prior Publication Data

US 2022/0075020 A1  Mar. 10, 2022

(51) Int. Cl.
  *G01S 7/02* (2006.01)
  *G01S 7/35* (2006.01)
  *G01S 13/931* (2020.01)
  *H04B 1/02* (2006.01)
  *H04B 1/06* (2006.01)

(52) U.S. Cl.
  CPC ............ *G01S 7/023* (2013.01); *G01S 7/354* (2013.01); *G01S 13/931* (2013.01); *G01S 2013/9318* (2020.01); *G01S 2013/9321* (2013.01); *H04B 1/02* (2013.01); *H04B 1/06* (2013.01)

(58) Field of Classification Search
  CPC ........ G01S 7/023; G01S 7/354; G01S 13/931; G01S 2013/9318; G01S 2013/9321; H04B 1/02; H04B 1/06
  USPC .......................................................... 342/71
  See application file for complete search history.

(56) References Cited

U.S. PATENT DOCUMENTS

| | | | | | |
|---|---|---|---|---|---|
| 1,362,693 | A | * | 12/1920 | Calistus | B63B 45/00 362/477 |
| 4,994,810 | A | * | 2/1991 | Sinsky | G01S 7/40 342/194 |
| 5,274,386 | A | * | 12/1993 | Pelion | H01Q 3/2629 342/383 |

(Continued)

FOREIGN PATENT DOCUMENTS

| EP | 1630713 A1 | * | 3/2006 | ........... G06K 7/0008 |
|---|---|---|---|---|
| EP | 1214795 B1 | * | 3/2011 | ............. H03D 3/008 |

(Continued)

*Primary Examiner* — Nuzhat Pervin
(74) *Attorney, Agent, or Firm* — Michael T. Gabrik; Frank D. Cimino

(57) ABSTRACT

An apparatus comprises a transmitter that transmits a signal, a receiver, a multiplier, and a signal shifter included in one of the transmitter and the receiver. The receiver receives a reflected signal comprising an interferer signal with at least one of an amplitude noise or a phase noise and generates a baseband signal comprising a real portion and an imaginary portion. The multiplier multiplies the imaginary portion by a value β chosen based on a power difference α between the amplitude noise and the phase noise, resulting in a modified baseband signal. The signal shifter shifts the interferer signal and the modified baseband signal. An estimator can process the reflected signal and estimate a frequency and phase of the interferer signal for the signal shifter. The value β can be represented as:

$$\beta = \frac{1}{\alpha^2}$$

where α represents the power difference between the amplitude noise and the phase noise.

24 Claims, 5 Drawing Sheets

(56) References Cited

U.S. PATENT DOCUMENTS

| | | | | |
|---|---|---|---|---|
| 5,872,540 | A * | 2/1999 | Casabona | H04K 3/90 455/283 |
| 6,064,320 | A * | 5/2000 | d'Hont | G07B 15/063 342/51 |
| 7,043,208 | B2 * | 5/2006 | Nigra | H04B 1/525 455/295 |
| 7,133,620 | B1 * | 11/2006 | Ho | H04B 10/2543 398/208 |
| 8,284,825 | B2 * | 10/2012 | Kamalizad | H04B 3/54 375/228 |
| 8,660,224 | B2 * | 2/2014 | Kent | H04L 25/03019 375/232 |
| 9,042,497 | B2 * | 5/2015 | Abdelmonem | H04B 17/21 375/232 |
| 9,191,613 | B2 * | 11/2015 | Silver | H04N 9/642 |
| 9,654,158 | B2 * | 5/2017 | Dafesh | H04B 1/719 |
| 9,660,674 | B2 * | 5/2017 | Baker | H04B 1/401 |
| 10,101,438 | B2 * | 10/2018 | Subburaj | G01S 7/023 |
| 10,164,756 | B2 * | 12/2018 | Baker | H04L 25/025 |
| 10,305,707 | B1 * | 5/2019 | Stein | H04L 25/03828 |
| 10,348,343 | B1 * | 7/2019 | Gupta | H04B 1/10 |
| 10,797,740 | B2 * | 10/2020 | Abdelmonem | H04W 72/048 |
| 10,952,155 | B2 * | 3/2021 | Tacconi | H04B 17/318 |
| 2004/0203458 | A1 * | 10/2004 | Nigra | H04B 1/525 455/296 |
| 2009/0304061 | A1 * | 12/2009 | Kamalizad | H04L 25/03006 375/228 |
| 2011/0163900 | A1 * | 7/2011 | Pagnanelli | H03M 3/468 341/166 |
| 2014/0266843 | A1 * | 9/2014 | Pagnanelli | H03M 3/468 341/155 |
| 2017/0019132 | A1 * | 1/2017 | Baker | H04B 1/525 |
| 2017/0019191 | A1 * | 1/2017 | Brannon | H04B 1/10 |
| 2017/0222733 | A1 * | 8/2017 | Baker | H04L 25/0212 |
| 2018/0074168 | A1 * | 3/2018 | Subburaj | G01S 7/038 |
| 2020/0025871 | A1 | 1/2020 | Subburaj et al. | |
| 2021/0156981 | A1 * | 5/2021 | Stettiner | G01S 7/0232 |
| 2021/0167996 | A1 * | 6/2021 | Ratnam | H04L 27/2649 |

FOREIGN PATENT DOCUMENTS

| | | | |
|---|---|---|---|
| EP | 2315405 A1 * | 4/2011 | H04L 27/3872 |
| WO | WO-2009149420 A1 * | 12/2009 | H04B 3/54 |

* cited by examiner

NOISE-MITIGATED RADAR SYSTEM

BACKGROUND

Radar systems rely on signal analysis to determine relevant information such as object detection in a received radar signal. The ability to determine relevant information is decreased by noise in the received radar signal, such as amplitude noise and phase noise introduced by interferer signals and the like. Interferer signals can be reflections of a transmitted radar signal off of a near-object reflector. For example in a radar system mounted behind the bumper of a vehicle for a driver assistance system, reflections off the bumper are interferer signals.

Some radar systems reduce noise in the received radar signal by signal shifting the interferer signal to approximately zero frequency, which isolates the amplitude noise into a real part of the received radar signal and the phase noise into an imaginary part of the received radar signal. These noise-mitigated radar systems then perform further signal processing on only one of the real part or the imaginary part, whichever experiences less noise. However, the noise figure of such noise-mitigated radar systems is only improved over radar systems without noise mitigation while the power difference between the amplitude noise and the phase noise is greater than some threshold power difference.

SUMMARY

An apparatus comprises a transmitter, a receiver, a multiplier, and a signal shifter included in one of the transmitter and the receiver. The transmitter transmits a signal, and the receiver receives a reflected signal comprising an interferer signal. The interferer signal comprises at least one of an amplitude noise or a phase noise. The receiver generates a baseband signal comprising a real portion and an imaginary portion based on the reflected signal. The multiplier multiplies the imaginary portion by a value $\beta$ to obtain a modified baseband signal. The value $\beta$ is chosen based on a power difference $\alpha$ between the amplitude noise and the phase noise. The signal shifter shifts the interferer signal and the modified baseband signal from the multiplier.

In some implementations, the apparatus also comprises an estimator that processes the reflected signal and determines the frequency and phase of the interferer signal. The signal shifter can shift the interferer signal based on the estimated frequency and phase from the estimator. The signal shifter can shift the interferer signal such that the interferer signal in the baseband signal has approximately zero frequency. The real portion of the baseband signal can comprise substantially all of one of the amplitude noise and the phase noise and substantially none of the other one of the amplitude noise and the phase noise, in some implementations. The imaginary portion comprises substantially all of the other one of the amplitude noise and the phase noise and substantially none of the one of the amplitude noise and the phase noise.

The value $\beta$ can be represented as:

$$\beta = \frac{1}{\alpha^2}$$

where $\alpha$ represents the power difference between the amplitude noise and the phase noise. In some implementations, the multiplier comprises an adder that adds the real portion and a product of the imaginary portion and the value $\beta$ to obtain the modified baseband signal.

The apparatus can also include a signal processor in some implementations. The signal processor receives the modified baseband signal from the signal shifter and performs a signal processing operation on it. The signal processor then performs an action based on the result of the signal processing operation. The signal processing operation can be an object detection, a distance determination, an angle of arrival operation, and a velocity determination, for example. The action performed by the signal processor based on the result of the signal processing operation can be changing a speed of a vehicle including the apparatus, presenting an alert, and the like.

BRIEF DESCRIPTION OF THE DRAWINGS

For a detailed description of various examples, reference will now be made to the accompanying drawings in which.

DETAILED DESCRIPTION

The noise-mitigated radar system described herein incorporates both the real and imaginary parts of the complex analog-to-digital converter (ADC) output, rather than one or the other of the real and imaginary parts, by multiplying the imaginary part by a parameter $\beta$. A value of the parameter $\beta$ is chosen to improve the signal-to-noise ratio (SNR) and is based on a power difference $\alpha$ between amplitude noise and phase noise introduced into the complex ADC output by an interferer signal. Multiplication of the imaginary part by a parameter $\beta$ introduces in-phase and quadrature gain mismatch into the complex ADC output, but it leaves the relative amplitudes and phases of the signal intact while also improving the SNR of the radar system.

Figure 1:
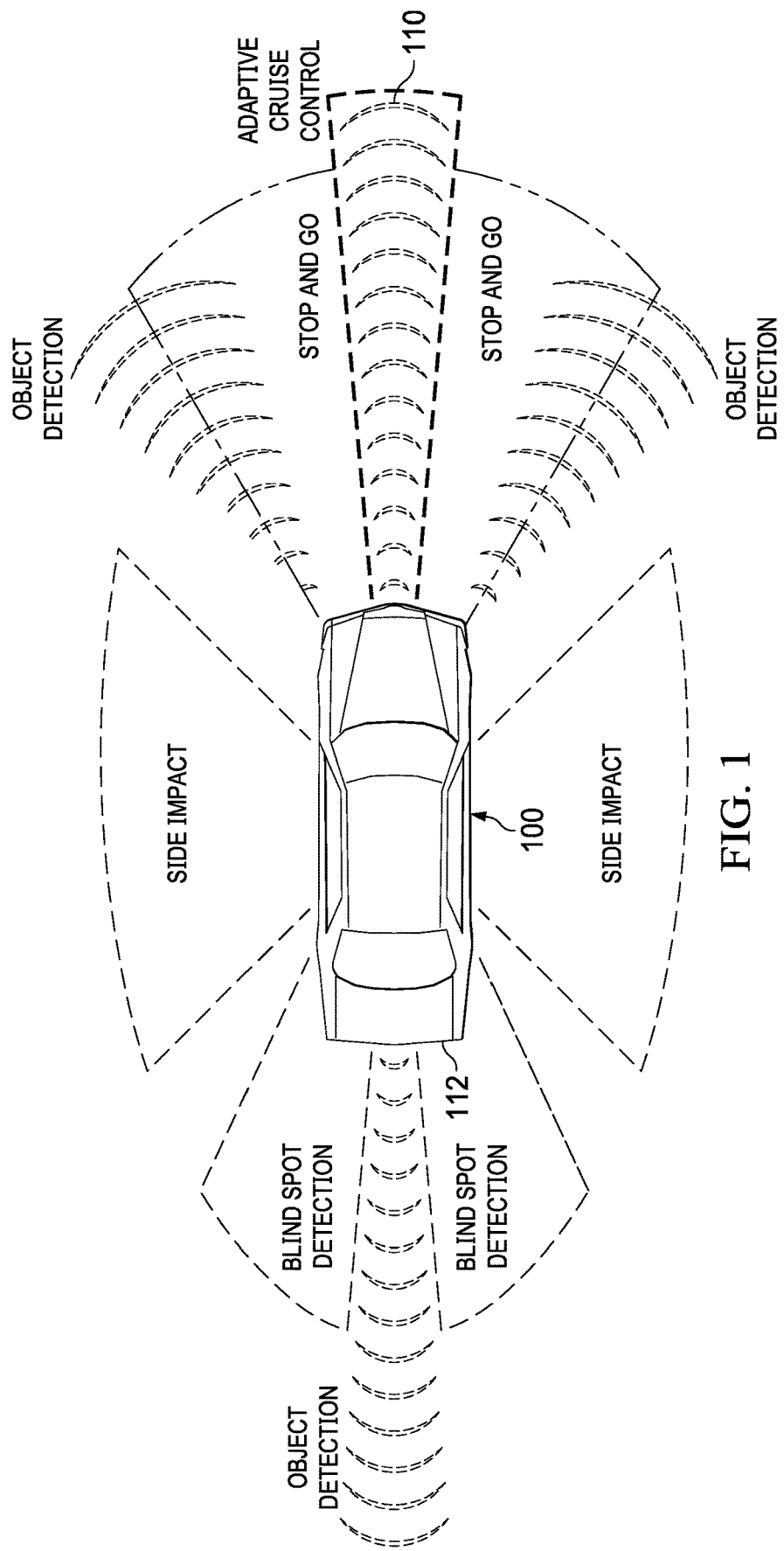
FIG. 1 illustrates an example automobile equipped with multiple radar systems for driver assistance.

FIG. 1 illustrates an example automobile 100 equipped with multiple radar systems 110, 112 for driver assistance, such as parking assistance, lane keeping assistance, object detection, adaptive cruise control, and the like. High resolution automotive radar systems have been developed to improve driving comfort and safety by measuring the distance from the vehicle to surrounding objects. These distances can be used to instruct a controller to react appropriately in various driving scenarios, such as parking assistance.

Some vehicles can have a single radar system 110 that is used for driver assistance, while some vehicles can have multiple radar systems, for example a first radar system 110 in the front of automobile 100 and a second radar system 112 in the back of the automobile 100. Some vehicles have multiple radar systems in the front, back, and sides of automobile 100. For example, a vehicle can have a total of eight radar systems: three radar systems in the front, in which one is angled straight ahead and the other two are angled to the left and right; three radar systems in the back, in which one faces straight back and the other two are angled to the left and right; one radar system on the driver-side; and one radar system on the passenger-side.

FIG. 1 illustrates a radar system used for purposes of automotive driving assistance, but radar systems can be used for industrial purposes as well, such as supply management, quality control, machine operation, and the like. For example, a millimeter wave radar system can be used to measure the height of stacks of paper or the diameter of spooled wire, which is then used to determine the quantity available for a manufacturing process. In an example hydraulic application such as heavy construction equipment with hydraulic pistons, a millimeter wave radar system can be used to determine the position of the piston and fluid level within the system, and assists in its control.

Figure 2:
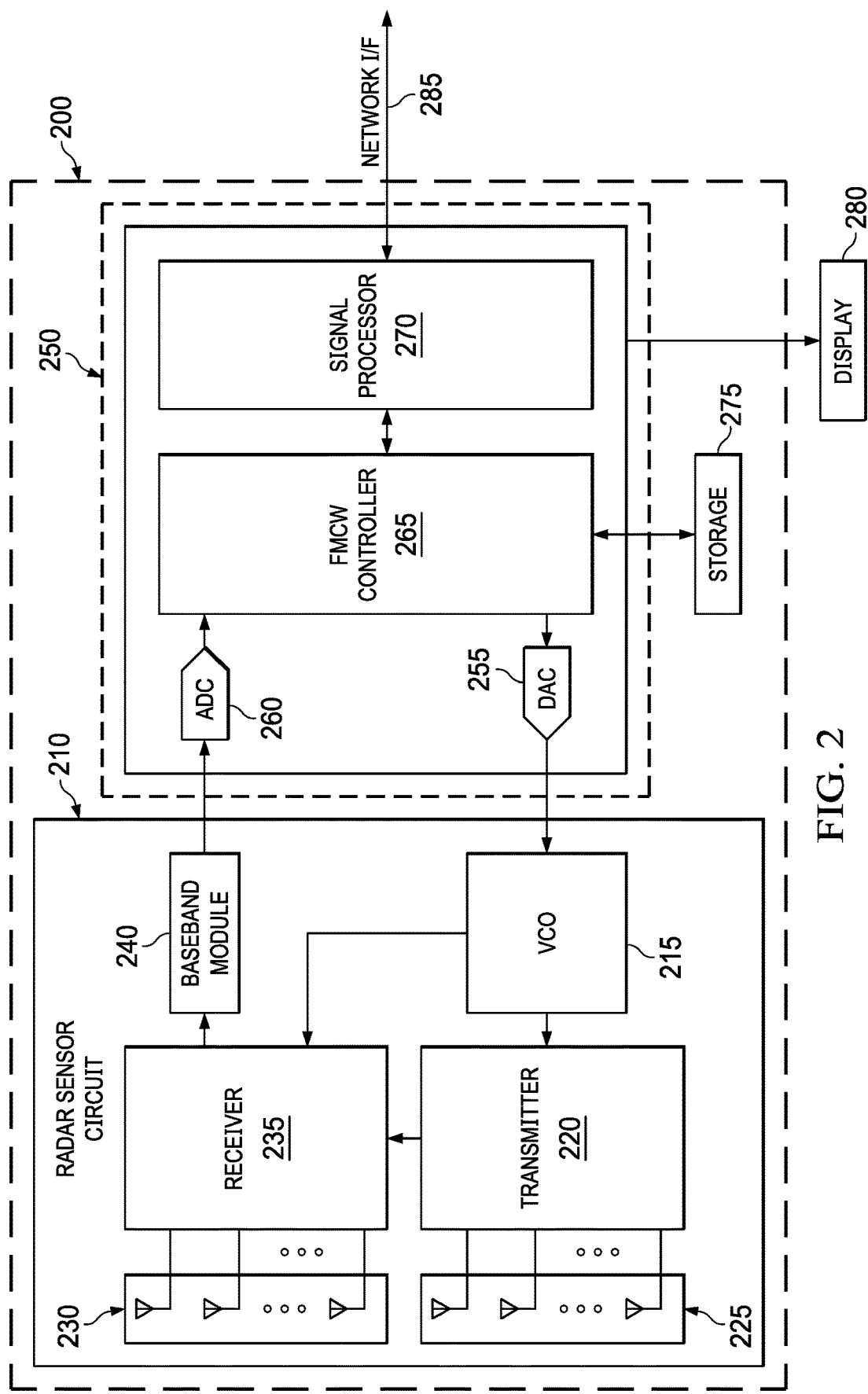
FIG. 2 illustrates a simplified block diagram of an example radar system.

FIG. 2 illustrates a simplified block diagram of an example radar system 200. Radar system 200 can be used in an automotive driving assistance system as shown in FIG. 1 or any other suitable application. Radar system 200 includes a radar sensor circuit 210, a controller 250, storage 275, and a display 280. Radar sensor circuit 210 includes a transmitter 220 that drives an antenna array 225 of one or more transmitter antennas. A receiver 235 receives signals from an antenna array 230 of one or more receiver antennas. A baseband module 240 amplifies and filters the received signals that are reflected from objects in the path of the transmitted chirp signals.

In some examples, transmitter 220 operates in the 77 GHz region and produces a frequency modulated continuous wave (FMCW) signal. The continuous wave signal is frequency modulated to form a series of chirps using a voltage-controlled oscillator (VCO) 215. In radar system 200, the transmitter antenna array 225 and receiver antenna array 230 are stationary with respect to radar system 200. In other examples, the antenna arrays may be configured to transmit and receive across a range of areas, such as by mechanical movement. In some implementations, the transmitter 220 and the receiver 235 are integrated together as a transceiver.

In a FMCW system, the transmitted chirp signal comprises a continuous wave whose frequency is modulated linearly over a fixed period of time. Received reflections are then mixed with the transmitted chirp signal to produce a received beat signal. Frequency differences between the received reflections and the transmitted chirp signal increase with delay and are therefore proportional to distance. Multiple chirps are transmitted in a unit called a frame. The phase differences between the received reflections across consecutive chirps allow the velocity of target objects to be computed. The phase differences between the received reflections at a first receiver antenna and the received reflections at a second receiver antenna allow the angle of arrival of target objects to be computed.

During normal operation, linear frequency chirps are transmitted, and reflected signals are received. The receiver and transmitter are arranged as a homodyne system so that the received reflections are down-converted directly into the baseband in receiver 235 using a copy of the transmitted signal from VCO 215. The baseband signals are then further filtered and amplified by baseband module 240. After analog-to-digital converter (ADC) 260 converts the baseband signals into the digital domain, time domain to frequency domain transforms such as fast FTs (FFTs) may be applied and other signal processing performed in order to determine the distance, velocity, and angle of arrival between the target object and radar system 200.

Controller 250 comprises one or more central processing unit (CPU) cores, digital signal processors, application specific integrated circuits, and the like, as described previously. The term "processing unit (PU) core" or "CPU core" (singular) is used herein to refer to either a single or multiple PU or CPU cores, and to broadly describe central processing units, digital signal processors, application specific integrated circuits, and the like. Controller 250 includes an FMCW controller 265 that receives a stream of data from receiver antenna array 230 via the receiver 235 and the baseband module 240 at an analog-to-digital converter (ADC) 260 and performs chirp generation and control of the transmitter 220 via a digital-to-analog converter (DAC) 255. A varying voltage tuning control signal from DAC 255 is used to control VCO 215.

Storage 275 may be used to store instructions and data received from antenna 230. Storage 275 may be any appropriate non-transitory storage medium, such as a static random access memory (SRAM). Controller 250 also includes a signal processor 270 that performs FFTs and other signal processing operations for determining a velocity, an angle of arrival, distance between the target object and radar system 200, and the like. Signal processor 270 can provide the determined values to display 280 and/or communicate with other systems via a network interface 285. Network 285 may include various combinations of local area networks (LANs), wide area networks (WANs), the internet and/or other known or later developed wired or wireless communication mechanisms, for example.

Figure 3:
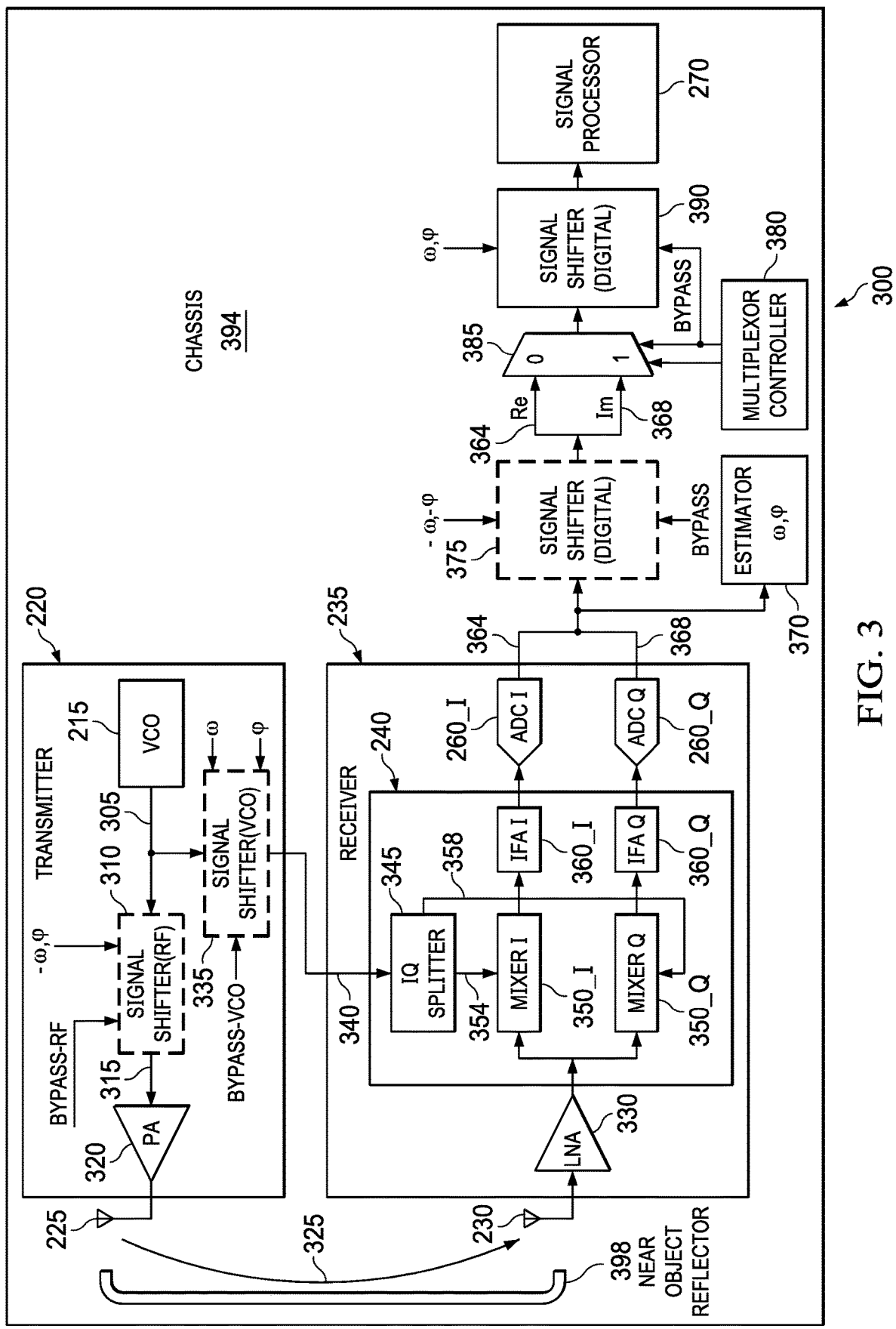
FIG. 3 illustrates a block diagram of a noise-mitigated frequency-modulated continuous wave (FMCW) radar system in which either the real or the imaginary part of the received signal is selected for signal processing.

FIG. 3 illustrates a block diagram of a noise-mitigated FMCW radar system 300 in which either the real or the imaginary part of the received signal is selected for signal processing. The noise-mitigated FMCW radar system 300 is described herein with reference to the radar system 200 shown in FIG. 2, and includes a transmitter 220, a receiver 235, an estimator 370, a signal processor 270, and a multiplexor controller 380. Radar system 300 is arranged to reduce at least one of amplitude noise and phase noise associated with an interferer signal.

Transmitter 220 includes a VCO 215, a power amplifier (PA) 320, the transmission antenna 225, and an optional signal shifter 310. The VCO 215 generates an output signal 305. The output signal 305 is provided to PA 320, via the signal shifter 310 in implementations including it, and to the IQ splitter 345 in the baseband module 240 of the receiver 235, via the signal shifter 335 in implementations including it. Signal shifters 310 and 335 are configured to shift the spectrum of the output signal 305 by the determined magnitude of the frequency and phase of the interferer signal. When the bypass signal is asserted, the outputs 315 and 340 are substantially the same as the output signal 305 from the VCO 215. The PA 220 amplifies its input signal for transmission through antenna 225.

The transmitted signal 325 from transmitter antenna 225 reflects off of objects in the environment, including near-object reflector 398. Near-object reflector 398 can be a bumper of the vehicle chassis 394 in which the radar system 300 is mounted. The reflected signals are received by the antenna 230 and provided to the receiver 235. The receiver 235 includes a low noise amplifier (LNA) 330, the baseband module 240, and the in-phase (I) and quadrature (Q) ADCs 260_I and 260_Q, respectively. The baseband module 240 includes the IQ splitter 345, an in-phase mixer 350_I, a quadrature mixer 350_Q, an in-phase amplifier 360_I, and a quadrature amplifier 360_Q.

The LNA 330 receives the reflected signal and amplifies it. The I mixer 350_I and Q mixer 350_Q in the baseband module 240 receive the amplified reflected signal from the LNA 330. The IQ splitter 345 splits the output signal 305 from VCO 215 or the output signal 340 from signal shifter 335 into an in-phase signal 354 and a quadrature signal 358. The phases of the I and Q signals 354 and 358, respectively, are 90 degrees apart and have the same frequency as the VCO 215 output signal 305. The I and Q signals 354 and 358 are provided to the I and Q mixers 350_I and 350_Q, respectively.

The in-phase and quadrature mixers 350_I and 350_Q down-convert the amplified reflected signal based on the I and Q signals 354 and 358, and generate a baseband signal based on the amplified reflected signal. The outputs of the I and Q mixers 350_I and 350_Q are provided to the in-phase intermediate frequency (IF) amplifier (IFA) 360_I and the quadrature IFA 360_Q. The outputs of the in-phase and quadrature IFAs 360_I and 360_Q are coupled to the in-phase and quadrature ADCs 260_I and 260_Q, respectively.

The digital output 364 of the in-phase ADC 260_I is a real part of the complex ADC output, and the digital output 368 of the quadrature ADC 260_Q is an imaginary part of the complex ADC output. The complex ADC output can be represented as:

$$\text{output } 364 + j(\text{output } 368)$$

where j represents the square root of negative one. The complex ADC output is provided to the estimator 370, which estimates the frequency and phase of an interferer signal resulting from a dominant reflection in the complex ADC output. The estimator 370 determines the dominant reflection by performing an FFT of the complex ADC output and determining which FFT output bin, for example a peak bin, corresponds to the frequency of the interferer signal. In some implementations, the estimator 370 is incorporated into the signal processor 270.

The estimated frequency ω and phase φ of the interferer signal are used (singly or in combination) to program a signal shift in the optional signal shifter 335 and/or the digital signal shifter 390. The negative frequency −ω and the negative phase −φ are used (singly or in combination) to program the signal shift in the optional signal shifter 310 and/or the optional signal shifter 335. Signal shifters 310, 335, and 375 are optional components, in that radar system 300 includes at least one of the optional shifters. In a radar system 300 that includes optional signal shifters 310 and 375, for example, the sum of the signal shifts of both signal shifters 310 and 375 is approximately equal to the signal shift of either signal shifter 310 or signal shifter 375 used alone.

The initial signal shift is one of a frequency shift, a phase shift, or both, and performed by one or more of optional signal shifters 310, 335, and 375. Shifting the spectrum by the frequency and phase of the interferer signal causes it to be transformed into a direct current (DC) signal with a frequency of 0 Hz at the input of multiplexor 385, effectively derotating the interferer signal. Accordingly, the in-phase signal chain and the in-phase output signal 364 includes substantially all of the amplitude noise (Anoise) and substantially none of the phase noise (φnoise) of the interferer signal. Conversely, the quadrature signal chain and the quadrature output signal 368 includes substantially none of the Anoise and substantially all of the φnoise of the interferer signal.

The real part 364 and the imaginary part 368 of the complex ADC output signal are coupled to the multiplexor 385, via the optional digital signal shifter 375 if included and enabled. The multiplexor 385 selects one of the real part 364 or the imaginary part 368 to forward to the signal shifter 390 based on a control signal from a multiplexor controller 380. The multiplexor controller 380 compares the Anoise in the in-phase signal 364 with the φnoise in the quadrature signal 368. The multiplexor controller 380 selects the imaginary part 368 while the Anoise is greater than the φnoise, and conversely selects the real part 364 while the φnoise is greater than the Anoise.

The multiplexor controller 380 can assert a bypass signal, for example, when the Anoise and the φnoise differ in power by less than a predetermined threshold. While the bypass signal is asserted, multiplexor 385 outputs both the real part 364 and imaginary part 368 of the complex ADC output. The bypass signal is provided to optional signal shifter 310, optional digital signal shifter 375, and signal shifter 390, such that their respective input signals are directly forwarded as their output signals without frequency or phase shifts.

The outputs of the multiplexor controller 380 and the multiplexor 385 are provided to digital signal shifter 390, which compensates for the initial signal shifting performed by signal shifters 310, 335, and/or 375. The correctional signal shift is substantially equal and opposite to the initial signal shifting performed by one or more of the signal shifters 310, 335, and 375, and allows the distance, angle of arrival, and velocity determinations to be performed without error from the signal shifting. The output of signal shifter 390 is coupled to signal processor 270 for the additional signal processing.

The radar system 300 introduces a degradation in the noise figure based on the predetermined threshold power difference in the Anoise and the φnoise, however. Thus the noise mitigation process in radar system 300 is only an improvement over no mitigation process at all while the difference in noise power between the I and Q signal chains is greater than the predetermined threshold.

Figure 4:
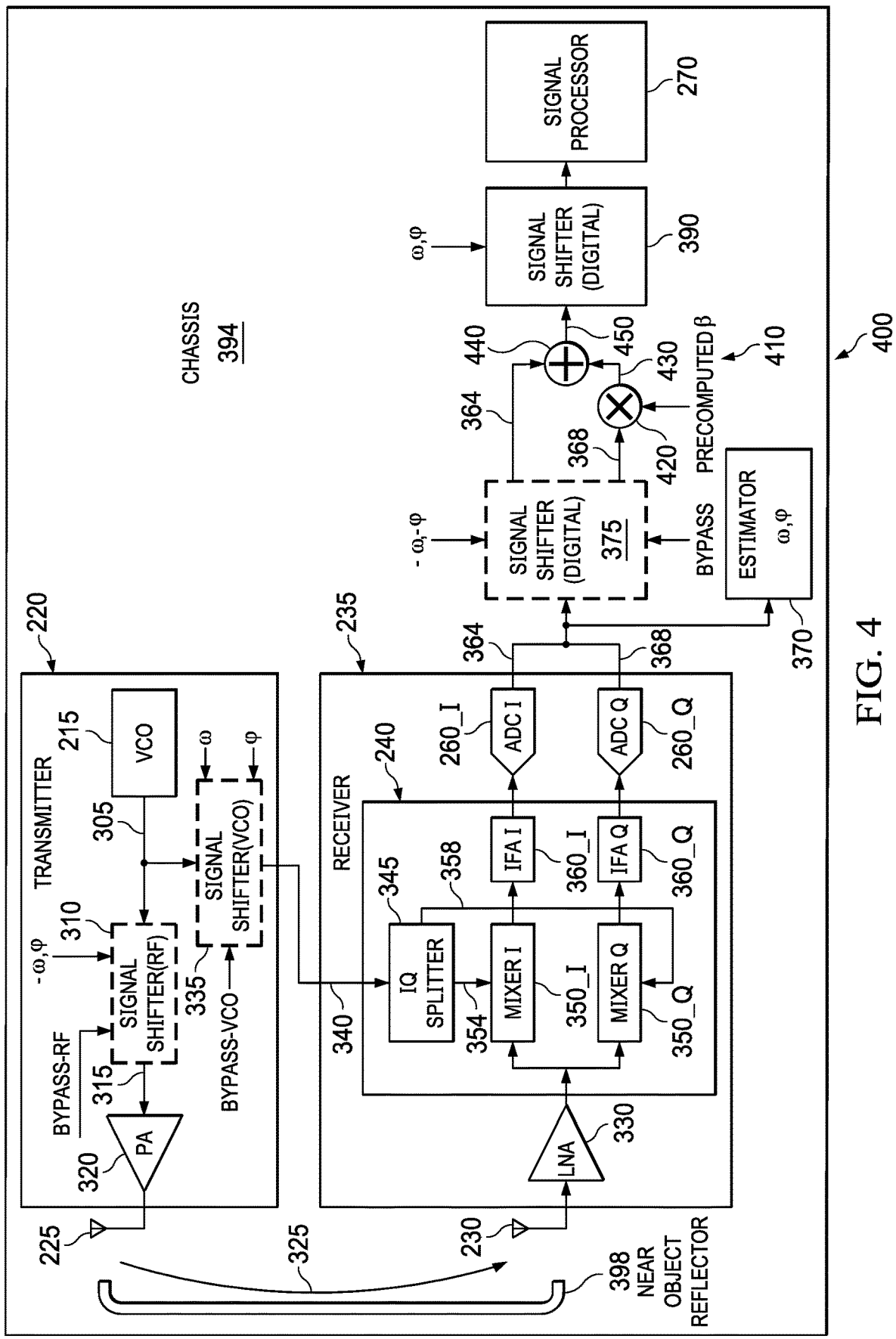
FIG. 4 illustrates a noise-mitigated FMCW radar system in which both the real and the imaginary part of the received signal are used for signal processing.

FIG. 4 illustrates a block diagram of a noise-mitigated FMCW radar system 400 in which both the real and the imaginary part of the received signal are selected for signal processing.

The IQ receiver 235 described herein with reference to FIGS. 2 and 3 outputs the complex ADC output Sif(t), which can be represented as:

$$Sif(t) = (1 + A\text{noise}(t)) \times e^{j\varphi\text{noise}(t)}(R\text{bumper})$$
$$(e^{j(\varphi\text{bumper} + (\omega\text{bumper})t)}) + (\text{other reflections}) + (\text{thermal noise})$$

where Rbumper represents the amplitude of the interferer signal from reflections off of bumper 398; φbumper represents the frequency of the interferer signal; ωbumper represents the phase of the interferer signal; other reflections represent the signals reflected off of other, target objects in the environment; and thermal noise represents thermal noise experienced by the radar system 400.

Derotating the interferer signal to a DC signal and correcting the phase separates the Anoise and φnoise:

$$\widetilde{Sif(t)} = \text{real(other reflections)} + \alpha Ni(t) + j(\text{imag(other reflections)} + \alpha \sigma Nq(t))$$

where Ni(t) and Nq(t) are Gaussian white noise signals, σ represents the standard deviation of the sum of the Anoise and the real part of the thermal noise signal, and a represents the imbalance in noise power between the I and Q signal chains, such that aα represents the standard deviation of the sum of the φnoise and the imaginary part of the thermal noise signal.

The real signal 364 from IQ receiver 235 can be represented as:

real signal 364 = real(other reflections) + σNi(t)

$$\text{real signal } 364 = \frac{1}{2}\sum_{i}^{N} A_i \left[ e^{(j2\pi f_i t + \phi_i)} + e^{-(j2\pi f_i t + \phi_i)} \right] + \sigma Ni(t)$$

and the imaginary signal 368 from IQ receiver 235 can be represented as:

imaginary signal 368 = imag(other reflections) + ασNq(t)

$$\text{imaginary signal } 368 = \frac{1}{2j}\sum_{i}^{N} A_i \left[ e^{(j2\pi f_i t + \phi_i)} - e^{-(j2\pi f_i t + \phi_i)} \right] + \alpha\sigma Nq(t)$$

The imaginary signal 368 can be multiplied 420 by a precomputed parameter β 410 that is chosen to introduce an IQ gain mismatch that improves the signal-to-noise ratio (SNR). The SNR of any given reflection Ai can be represented as a function of σ and α:

$$SNRi = \frac{A_i^2/4}{\sigma^2}\left(\frac{(1+\beta)^2}{1+(\beta\alpha)^2}\right)$$

The maximum SNR is achieved for:

$$\beta\ 410 = \frac{1}{\alpha^2}$$

Despite the apparent introduction of the IQ gain mismatch, no useful information regarding the relative amplitudes, the phases, and the like is destroyed. However, any negative frequencies from noise spurs or other IQ gain mismatch are folded back to positive frequencies and risk introducing ghost artifacts into the later signal processing. In many examples of FMCW radar signals, all valid objects are positive frequencies, rather than negative, and IQ gain mismatch calibration can reduce the likelihood of negative frequencies and ghost artifacts.

The modified imaginary signal 430 output from the multiplier 420 can be represented as:

signal 430=β[imag(other reflections)+ασNq(t)]

such that the modified, complex IF signal 450 output by adder 440 can be represented as:

signal 450=real(other reflections)+σNi(t)+βj(imag (other reflections)+ασNq(t))

The modified, complex IF signal 450 is then provided to signal shifter 390 and to signal processor 270 for further radar signal processing, such as distance, angle of arrival, and velocity determinations. The automobile including the chassis 394 and the bumper 398 can perform an action based on the distance, angle of arrival, and velocity determinations, such as presenting a user alert, increasing or decreasing a movement speed of the automobile, or steering the automobile.

Figure 5:
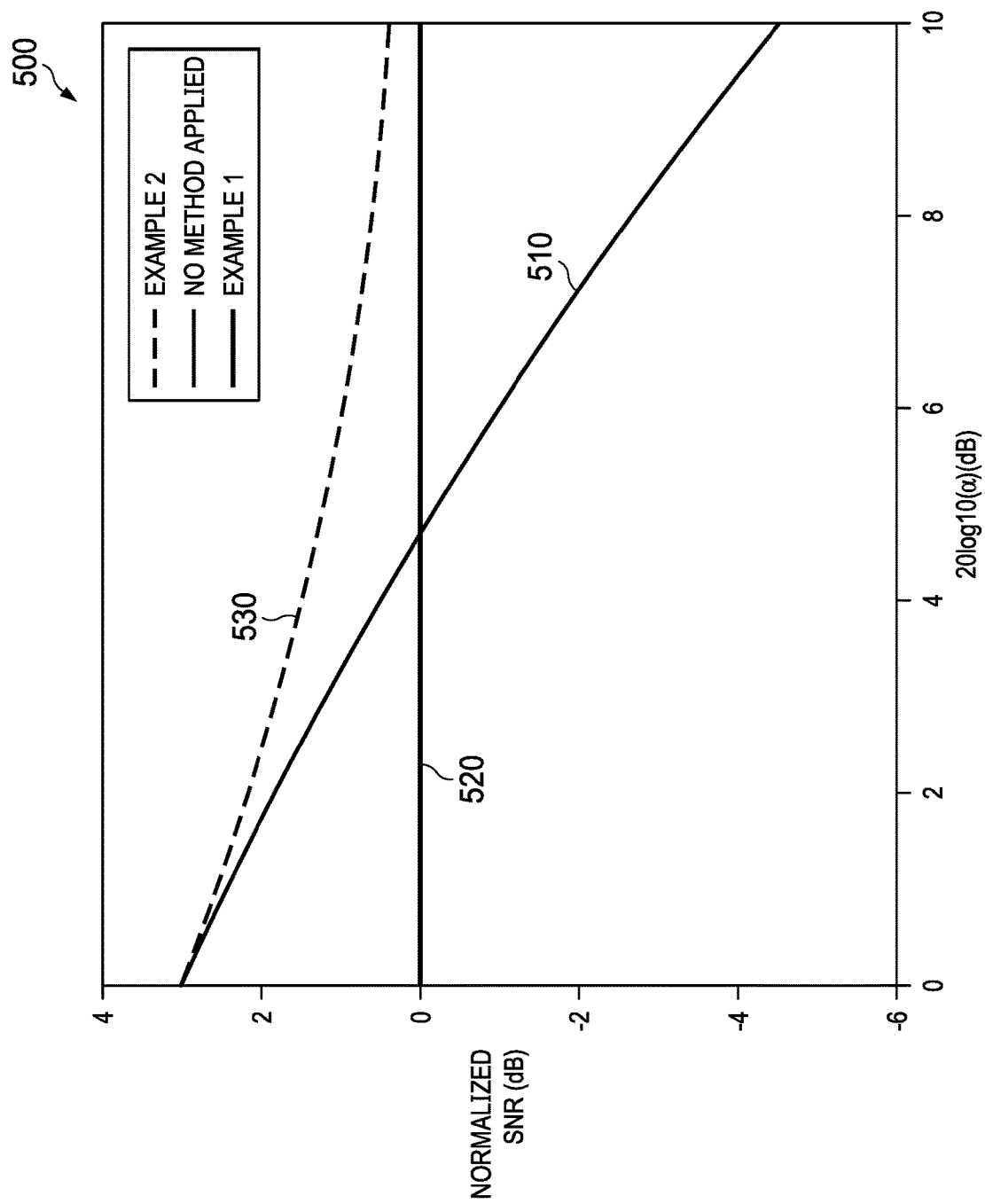
FIG. 5 illustrates a graph of the signal-to-noise ratios (SNRs) for a radar system without a noise mitigation process, the radar system shown in FIG. 3, and the radar system shown in FIG. 4.

FIG. 5 illustrates a graph of the signal-to-noise ratios (SNRs) for a radar system without a noise mitigation process, the radar system 300 shown in FIG. 3, and the radar system 400 shown in FIG. 4. The SNR 510 corresponds to a radar system without a noise mitigation process. The radar system 300 is chosen to operate with a threshold power difference in the Anoise and the φnoise of approximately three dB, and corresponds to the SNR 520, normalized to zero dB. The SNR 530 corresponds to the radar system 400.

The SNR 520 for radar system 300 is only better than the SNR 510 for a radar system without a noise mitigation process while the imbalance a in noise power between the I and Q signal chains is greater than the threshold power difference, approximately three dB. In contrast, the SNR 530 for radar system 400 is consistently better than both the SNR 510 for the radar system without a noise mitigation process and the SNR 520 for the radar system 300.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. An apparatus, comprising:
   a receiver configured to:
      receive a first signal comprising an interferer signal, wherein the interferer signal comprises at least one of an amplitude noise or a phase noise, and
      generate a baseband signal based on the first signal, wherein the baseband signal comprises a real portion and an imaginary portion;
   a multiplier configured to multiply the imaginary portion by a value β to obtain a modified baseband signal, wherein the value β is computed based on a power difference α between amplitude noise and the phase noise; and
   a processor configured to:
      determine a distance, an angle of arrival, or a velocity based on the modified baseband signal.

2. The apparatus of claim 1, further comprising an estimator configured to process the first signal and estimate a frequency and phase of the interferer signal.

3. The apparatus of claim 2, further comprising a signal shifter configured to signal shift the interferer signal based on the estimated frequency and phase of the interferer signal.

4. The apparatus of claim 3, wherein:
   the real portion comprises substantially all of one of the amplitude noise and the phase noise and substantially none of the other one of the amplitude noise and the phase noise; and
   the imaginary portion comprises substantially all of the other one of the amplitude noise and the phase noise and substantially none of the one of the amplitude noise and the phase noise.

5. The apparatus of claim 1, further comprising a signal shifter configured to signal shift the interferer signal such that the interferer signal in the baseband signal has approximately zero frequency.

6. The apparatus of claim 1, wherein the value β is computed based on:

$$\beta = 1/\alpha^2$$

where α represents the power difference between the amplitude noise and the phase noise.

7. The apparatus of claim 1, further comprising an adder configured to add the real portion and a product of the imaginary portion and the value β to obtain the modified baseband signal.

8. The apparatus of claim 1, wherein the processor is configured to perform object detection based on the modified baseband signal.

9. A system, comprising:
- a transmit antenna configured to transmit a radar signal from a transmitter;
- a receiver antenna configured to receive a reflected radar signal comprising an interferer signal, wherein the interferer signal comprises at least one of an amplitude noise or a phase noise;
- a receiver configured to receive the reflected radar signal from the receiver antenna;
- a mixer configured to generate a baseband signal based on the received reflected radar signal from the receiver, wherein the baseband signal contains a real portion and imaginary portion;
- a multiplier configured to multiply the imaginary portion by a parameter to obtain a modified imaginary portion, wherein a value of the parameter is precomputed based on a power difference between the amplitude noise and the phase noise;
- an adder configured to add the real portion and the modified imaginary portion to obtain a modified baseband signal;
- a signal shifter arranged in the receiver and configured to signal shift the modified baseband signal; and
- a signal processor configured to:
  - receive the modified baseband signal from the signal shifter, and
  - perform a signal processing operation on the modified baseband signal.

10. The system of claim 9, wherein the value of the parameter is precomputed based on:

$$\beta = 1/\alpha^2$$

where β represents the value of the parameter and α represents the power difference between the amplitude noise and the phase noise.

11. The system of claim 9, wherein the interferer signal is a result of a near object reflecting the transmitted radar signal.

12. The system of claim 11, wherein the near object is substantially stationary with respect to the receiver antenna.

13. The system of claim 9, wherein the receiver antenna is mounted to a chassis of a vehicle.

14. The system of claim 13, wherein the interferer signal is a result of a bumper of the vehicle reflecting the transmitted radar signal.

15. The system of claim 13,
- wherein the signal processor is further configured to perform an action based on a result of the signal processing operation, and
- wherein the action comprises changing a speed of the vehicle.

16. The system of claim 13,
- wherein the signal processor is further configured to perform an action based on the result of the signal processing operation, and
- wherein the action comprises presenting an alert.

17. The system of claim 9, wherein the signal processing operation comprises one of an object detection, a distance determination, an angle of arrival operation, and a velocity determination.

18. A method, comprising:
- receiving a first signal comprising an interferer signal, wherein the interferer signal comprises at least one of an amplitude noise or a phase noise;
- generating a baseband signal based on the received first signal, wherein the baseband signal comprises a real portion and an imaginary portion;
- multiplying the imaginary portion by a parameter β to obtain a modified imaginary portion, wherein a value of the parameter β is chosen based on a power difference α between the amplitude noise and the phase noise;
- adding the modified imaginary portion and the real portion to obtain a modified baseband signal; and
- determining a distance, an angle of arrival, or a velocity based on the modified baseband signal.

19. The method of claim 18, further comprising shifting the interferer signal such that the interferer signal has approximately zero frequency.

20. The method of claim 18, wherein the value of the parameter β is chosen based on:

$$\beta = 1/\alpha^2$$

where α represents the power difference between the amplitude noise and the phase noise.

21. The method of claim 18, further comprising performing object detection based on the modified baseband signal.

22. The method of claim 21, further comprising performing an action based on a result of the object detection, wherein the action comprises at least one of changing a speed of a vehicle, presenting an alert, or steering the vehicle.

23. The apparatus of claim 1, wherein to generate the baseband signal, the receiver is configured to:
- down-convert the first signal to generate an intermediate frequency signal; and
- analog-to-digital convert the intermediate frequency signal to the baseband signal.

24. The method of claim 18, wherein generating the baseband signal comprises:
- generating an intermediate frequency signal by down-converting the received first signal; and
- analog-to-digital converting the intermediate frequency signal to the baseband signal.

* * * * *